Dec. 11, 1962 H. N. PARKER 3,067,524
EDUCATIONAL TOY
Filed April 17, 1961 2 Sheets-Sheet 1
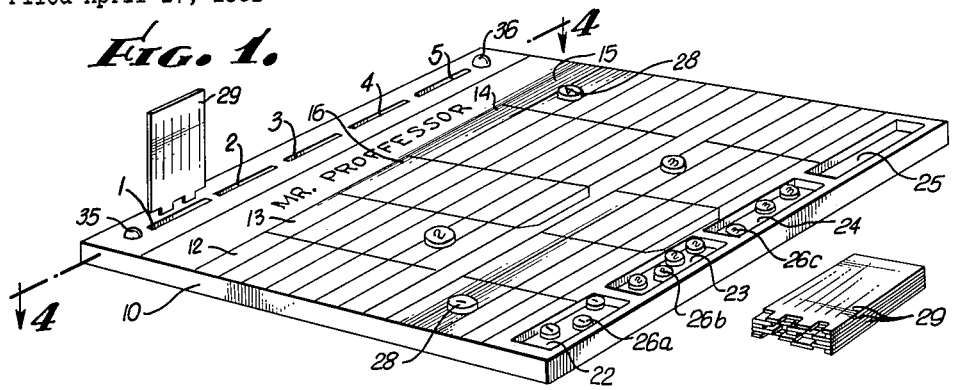
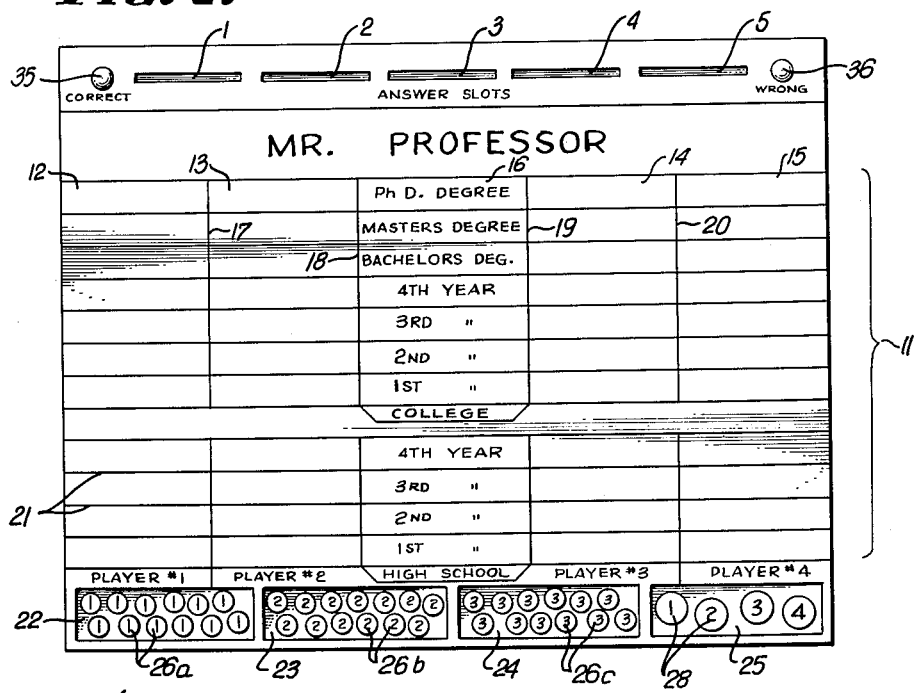
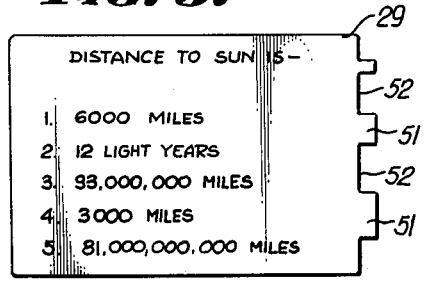
INVENTOR.
HAROLD N. PARKER
BY
Flam and Flam
ATTORNEYS.

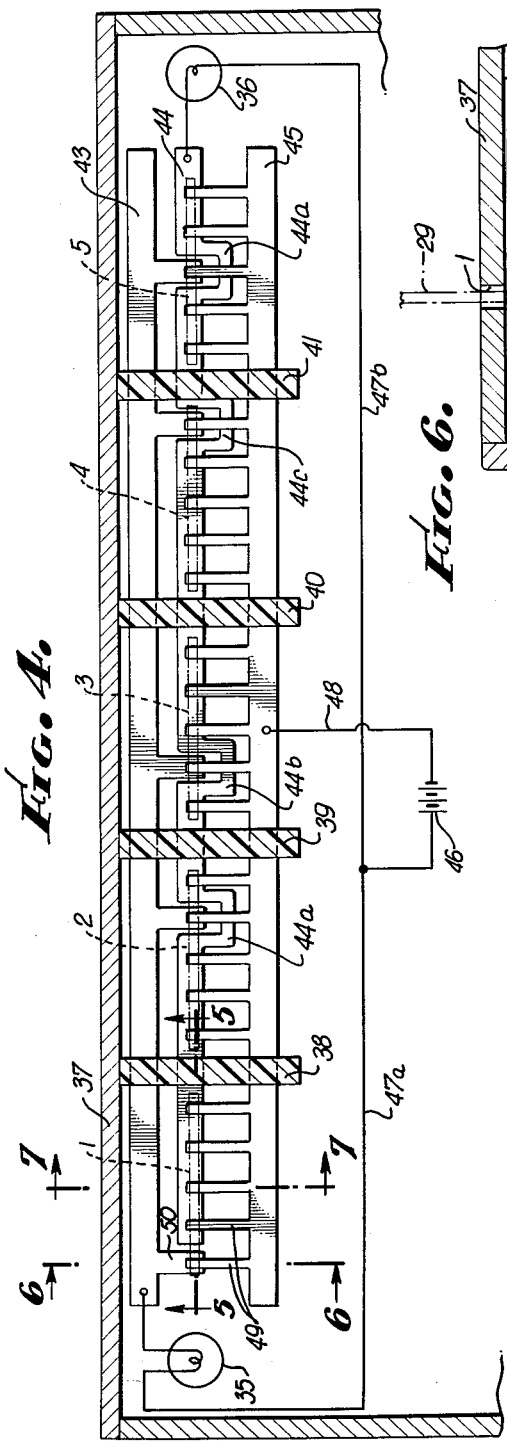

3,067,524
EDUCATIONAL TOY
Harold N. Parker, Van Nuys, Calif., assignor to Calbest Engineering & Electronics Co., Los Angeles, Calif., a corporation of California
Filed Apr. 17, 1961, Ser. No. 103,550
10 Claims. (Cl. 35—9)

This invention relates to an educational game.

The object of this invention is to provide a unique question and answer game, and unique apparatus for implementing games of that character.

I propose a game, the central interest of which is a pack of cards on each of which a question and multiple choice answers are imprinted. By inserting the cards in slots corresponding to the multiple choice, an indication corresponding to "correct" or "wrong" is given.

Another object of this invention is to provide simple circuit means for "reading" coded material on the card to operate appropriate circuits for giving indications corresponding to "correct" or "wrong."

Still another object of this invention is to provide a simple code system for a question card in which the correct answer cannot be readily perceived by the players except by the use of the decoding apparatus.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a pictorial view of the apparatus incorporating the present invention;

FIG. 2 is a plan view illustrating the playing board;

FIG. 3 is a plan view of a card containing a question and multiple choice answers for use with the apparatus;

FIG. 4 is an enlarged sectional view, taken along a plane indicated by the line 4—4 of FIG. 1; and FIGS. 5, 6 and 7 are further enlarged sectional views taken along planes corresponding to lines 5—5, 6—6 and 7—7 of FIG. 4.

The game is played on a board which constitutes the upper surface of a hollow, shallow rectangular box 10. The board has a central playing area 11, divided into five vertical columns 12, 13, 14, 15 and 16 that together extend across the box 10. The columns are formed lines or markings 17, 18, 19 and 20. The columns are each divided into separate blocks by uniformly spaced horizontal lines 21. The blocks of the central column 16 bear legends corresponding to different academic levels, beginning with "1st Year" high school and ending with "Ph. D. Degree." Blocks to the right and left in the playing columns 12, 13, 14 and 15 are accordingly designated.

Containers 22, 23, 24 and 25 are formed at the bottom of the board 10 by any suitable package design. In the containers 22, 23 and 24 are credit discs 26a, 26b and 26c, respectively numbered 1, 2 and 3. In the last container 25 are player markers 28, used to note the position of the player during the course of the game.

Question cards 29 are used in the course of play. Each card, as illustrated for example in FIG. 3, contains a question and five multiple choice answers, only one of which is correct. The cards, as shown in FIG. 1, are placed face down in front or alongside the box 10. Markers 28 are selected by chance and the player with the marker number 1 is the first to play. The player with marker number 2 is the second to play, etc.

The object of the game is to earn "scholastic credits" to achieve the "Ph. D. Degree." Play is commenced by the players "entering high school" by placing their markers in blocks of their respective columns 12, 13, 14 and 15 opposite the high school legend "1st Year."

The player first in turn takes his freshman examination by picking the cards from the pack. The first question is read, and one of the five answers is decided upon. Assuming that the first examination card is shown in FIG. 3, then the correct answer, of course, corresponds to answer No. 3. The "examination" is "graded" right or wrong by apparatus in the box 10 that reads the correct answer from the card. The examination is submitted by inserting the card in one of five slots 1, 2, 3, 4 or 5 at the top of the box 10 just above the playing area. If the player selects answer No. 3, he places the card in the slot 3. The answer being correct, a "correct" light 35 is illuminated. If the player had placed the card 29 in any other slot 1, 2, 4 or 5, a "wrong" light 36 would have illuminated. The player has three chances on each of his three examination cards. In order to advance one school year, a player must earn six credits, arbitrarily defined as a "passing grade." A correct answer on the first try is worth three credits, on the second try, two credits, on the third try, one credit, and on the fourth or fifth tries, no credits. A credit disc 25, 26 or 27 placed adjacent the player marker cumulates the results of the three tests of the examination.

If, after taking his examination of three questions, a player has accumulated six, seven or eight credits, he advances to the succeeding school year, returning his credit discs to the appropriate container 22, 23 or 24. He then awaits his next turn.

If a player earns five credits for his examination, he may elect to take a "make-up" examination by selecting a fourth card. If the answer chosen at the first insertion of the card is correct, the make-up examination has been completed and the player advances to the next school year, returning the credit discs. If he fails his make-up examination, he must "drop out of school" by sitting out on his next turn. If the player elects not to take a make-up examination, he repeats the school year on the next round.

If a player earns only three or four credits on his examination, the player has failed and must repeat the school year on the next round of play.

A player who receives two or less credits must drop out of school by sitting out on this next round.

Any player who earns nine credits for his three examinations is entitled to "skip a school year" and advance accordingly. The first to attain the degree of Ph. D. wins the game.

The apparatus for reading the card 29 is shown in FIG. 4, 5, 6 and 7. In FIG. 4 the upper end 37 of the box forming the board 10 is illustrated, the slots 1, 2, 3, 4 and 5 appearing in dotted lines. Spacers 38, 39, 40 and 41 extend at areas located between the slots and provide reinforcement. The spacers are adhered to the inner surfaces of the top and bottom walls of the box.

Extending across the box and on the inside thereof are three bus bars 43, 44 and 45 made of thin conductive material. They may be adhered to the bottom of the box by suitable means. The bus bar 43 connects to one side of a battery 46 via the "correct" lamp 35 and a lead 47a. The intermediate bus bar 44 connects to the same side of the battery 46 via "wrong" lamp 36 and a lead 47b. The third bus bar 45 connects via a lead 48 to the other side of the battery.

Projecting from the bus bar 45 are switch arms in the form of integral spring fingers 49. The fingers 49 are divided into five groups corresponding to the number of the slots. Four of the switch fingers 49 in each group may engage the "wrong" bus bar 44 to complete a circuit for the "wrong" light 36. The fifth of the switch fingers 49 in each group may engage the "correct" bus bar 43 to complete a circuit for the "correct" light 35. Four of the fingers of each group extend in spaced juxtaposed relationship to the central bus bar 44, and the fifth finger of each group extends in spaced juxtaposed relationship to an integral tab 50, projecting from the "correct" bus bar 43. The ends of the fingers 49 are situated as to be engaged by the edge of the card 29 inserted in the slot. If the card engages one of the four tabs 49 above the "wrong" bus bar 44, of course, the "wrong" light 36 operates. If, however, the spring finger 49 above the projecting tab 50 of the "correct" bus bar 43 is engaged, the "correct" light 35 operates.

In order to cause the "correct" light 35 to be operated only when the slot selected corresponds to the right answer, and in order to cause the "wrong" light 36 to be operated when a slot corresponding to a wrong answer is selected, the one card edge is coded by having one or more projections 51 formed by recesses or notches 52. Only one of the projections 51 is positioned to engage a finger 49, the others falling between the fingers 49 and being provided primarily for confusion or for obscuring the nature of operation to ensure that the player selects his answer on knowledge apart from the code. By way of example, the correct answer to the question on the card 29 shown in FIG. 5 is No. 3. Beneath the slot corresponding to answer No. 3, the first, third, fourth and fifth tabs 51 are above the "wrong" bus bar 44, whereas the second finger 51 engages the tab 50 of the "correct" bus bar 43. Accordingly, the operative projection 51 of the card 29 is so placed as to engage the second finger.

The position of the tab 50 from group to group changes so that the circuit to the "correct" bus bar 43 is established only by insertion of the card in the correct slot, the "wrong" circuit being established in all other cases. For this purpose, the position of the tab 50 for each corresponds to position number 1 for slot number 1, position number 4 for slot number 2, position 2 for slot number 3, position number 5 for slot number 4, and position 3 for slot number 5. The position is deliberately changed and out of order with respect to the answers in order further to disguise the code.

The bus bar 44 has four offset portions 44a, 44b, 44c and 44d at places corresponding to the tabs 50 to ensure that the circuits operate separately. The fingers 49 are so elevated (FIGS. 6 and 7) by a backing strip 52 that the offset portions are cleared even when the fingers 49 are flexed to engage the tabs.

In practice, the width of the projections or the fingers may be varied for coding purposes. The number of the projections on the card edge may also be varied. Also the fingers 49 may be spaced non-uniformly.

The inventor claims:

1. In an educational device; a set of cards each having a question and multiple choice answers, one of which is correct; each of said cards having an edge slotted in a coded manner to denote the correct answer; a support having a plurality of slots corresponding to the multiple choice answers for receiving the card edge; circuit means at each slot operated by the card edge and providing an indication that the slot selected corresponds to the right or the wrong answer.

2. In an educational device: a set of cards each having a question and multiple choice answers, one of which is correct; each of said cards having an edge slotted in a coded manner to denote the correct answer; a playing board having a plurality of slots corresponding to the multiple choice answers for receiving the card edge; a pair of bus bars beneath the playing board; switch arms actuated by the card edge for engaging the bus bars; circuit means completed through the switch arms and one bus bar for giving one indication; and circuit means completed through the switch arms and the other bus bar for giving another indication; the switch arms being so positioned that one indication is given when the slot corresponding to the correct answer is selected, and the other indication is given when the slot corresponding to the other answers are selected.

3. In an educational device: a set of cards each having a question and a number of multiple choice answers, one of which is correct; each of said cards having a slotted edge; a playing board having a plurality of slots corresponding to the multiple choice answers for receiving the card edge; a set of switch arms for each slot and arrayed along the slot; circuit means cooperable with one switch of each set for giving an indication corresponding to "correct"; circuit means cooperable with the other switches for giving an indication corresponding to "wrong"; said cards being capable of segregation into groups in which the correct answers fall at the same choice position; the cards of each group having a projection means falling at a position to engage the "correct" indicating switch when the slot selected corresponds to the correct answer, and at a position to engage the said other switches when the slot selected corresponds to the wrong answer.

4. The combination as set form in claim 3 in which said card edges having extraneous projections that do not engage any switches.

5. The combination as set forth in claim 4 in which the operative projections of each group of cards are of various widths.

6. In an educational device: a set of cards each having a question and a number of multiple choice answers, one of which is correct; each of said cards having a slotted edge; a playing board having a plurality of slots corresponding to the multiple choice answers for receiving the card edge; a set of switch arms for each slot and arrayed along the slot; circuit means cooperable with one switch of each set for giving an indication corresponding to "correct"; circuit means cooperable with the other switches for giving an indication corresponding to "wrong"; there being as many switches in each set as there are slots; an electrically operated "correct" indicator energized upon operation of one switch from each set; an electrically operated "wrong" indicator energized upon operation of the other switches; the switches corresponding to "correct" occupying different positions in the sets; the slotted edges of the cards providing one operative projection for engaging a switch upon insertion into a slot, the projection being so positioned that the "correct" indicator is energized when the slot corresponding to the correct answer is selected.

7. The combination as set forth in claim 6 in which said card edges have extraneous projections that do not engage any switches.

8. The combination as set forth in claim 7 in which the operative projections are of various widths.

9. In an educational device: a set of cards each having a question and a number of multiple choice answers, one of which is correct; each of said cards having a slotted edge; a playing board having a plurality of slots corresponding to the multiple choice answers for receiving the card edge; said slots being substantially aligned; a first electrically conductive strip forming a first bus bar, and extending beneath the playing board along the slots; a second electrically conductive strip forming a second bus bar and extending beneath the playing board along the slots, and in electrically spaced relationship to said first conductive strip; a third conductive strip having integrally formed spring arms arranged in sets beneath the board slots; one spring arm of each set being capable of flexure electrically to engage said first conductive strip; the other arms being capable of flexure electrically to engage said second conductive strip; circuit means completed by said third conductive strip and the first conductive strip, by the aid of said arms, for giving an indication corresponding to "correct"; circuit means completed by said third conductive strip and the second conductive strip by the aid of said arms for giving an indication corresponding to "wrong"; the projections at the slotted edge of the cards being arranged to engage the spring arms appropriate to the answer corresponding to the slot selected.

10. The combination as set forth in claim 9 in which extraneous projections are provided on at least some of said cards.

References Cited in the file of this patent

UNITED STATES PATENTS

| | | |
|---|---|---|
| 779,229 | Mansfield | Jan. 3, 1905 |
| 2,340,251 | Nesbit | Jan. 25, 1944 |
| 2,539,077 | Hawkins | Jan. 23, 1951 |
| 2,586,234 | Kopas | Feb. 19, 1952 |
| 2,586,564 | Rinde | Feb. 19, 1952 |
| 2,943,399 | Davis | July 5, 1960 |